US009495345B2

(12) United States Patent
Munro et al.

(10) Patent No.: US 9,495,345 B2
(45) Date of Patent: Nov. 15, 2016

(54) METHODS AND SYSTEMS FOR MODELING COMPLEX TAXONOMIES WITH NATURAL LANGUAGE UNDERSTANDING

(71) Applicants: Robert J. Munro, San Franciso, CA (US); Schuyler D. Erle, San Francisco, CA (US); Tyler J. Schnoebelen, San Francisco, CA (US); Jason Brenier, Oakland, CA (US); Jessica D. Long, San Francisco, CA (US); Brendan D. Callahan, Philadelphia, PA (US); Paul A. Tepper, San Francisco, CA (US); Edgar Nunez, Union City, CA (US)

(72) Inventors: Robert J. Munro, San Franciso, CA (US); Schuyler D. Erle, San Francisco, CA (US); Tyler J. Schnoebelen, San Francisco, CA (US); Jason Brenier, Oakland, CA (US); Jessica D. Long, San Francisco, CA (US); Brendan D. Callahan, Philadelphia, PA (US); Paul A. Tepper, San Francisco, CA (US); Edgar Nunez, Union City, CA (US)

(73) Assignee: Idibon, Inc., San Francisco, CA (US)

( * ) Notice: Subject to any disclaimer, the term of this patent is extended or adjusted under 35 U.S.C. 154(b) by 0 days.

(21) Appl. No.: 14/964,511

(22) Filed: Dec. 9, 2015

(65) Prior Publication Data

US 2016/0162476 A1 Jun. 9, 2016

Related U.S. Application Data

(60) Provisional application No. 62/089,736, filed on Dec. 9, 2014, provisional application No. 62/089,742, filed on Dec. 9, 2014, provisional application No. 62/089,745, filed on Dec. 9, 2014, provisional application No. 62/089,747, filed on Dec. 9, 2014.

(51) Int. Cl.
*G06F 17/27* (2006.01)
*G06F 17/21* (2006.01)
(Continued)

(52) U.S. Cl.
CPC ........... *G06F 17/241* (2013.01); *G06F 3/0482* (2013.01); *G06F 17/2241* (2013.01);
(Continued)

(58) Field of Classification Search
CPC .......... G06F 17/2785; G06F 17/2881; G06F 17/27; G06F 17/2705; G06F 17/30684; G06F 17/30734; G06F 17/241; G06F 17/20; G06F 17/2755; G06F 17/30705; G06F 17/2241; G06F 17/2247; G06F 17/2715; G06F 17/30598; G06F 17/30604; G06N 5/02
See application file for complete search history.

(56) References Cited

U.S. PATENT DOCUMENTS 5,970,490 A * 10/1999 Morgenstern ..... G06F 17/30569
6,513,059 B1 * 1/2003 Gupta ................... G06F 9/4862
707/E17.111

(Continued)

OTHER PUBLICATIONS

A. Maedche and S. Staab, "Ontology learning for the Semantic Web," in IEEE Intelligent Systems, vol. 16, No. 2, pp. 72-79, Mar.-Apr. 2001.*

*Primary Examiner* — Edgar Guerra-Erazo
(74) *Attorney, Agent, or Firm* — K&L Gates LLP; Jordan A. Kwan

(57) ABSTRACT

Systems and methods are presented for the automatic placement of rules applied to topics in a logical hierarchy when conducting natural language processing. In some embodiments, a method includes: accessing, at a child node in a logical hierarchy, at least one rule associated with the child node; identifying a percolation criterion associated with a parent node to the child node, said percolation criterion indicating that the at least one rule associated with the child node is to be associated also with the parent node; associating the at least one rule with the parent node such that the at least one rule defines a second factor for determining whether the document is to also be classified into the parent node; accessing the document for natural language processing; and determining whether the document is to be classified into the parent node or the child node based on the at least one rule.

20 Claims, 11 Drawing Sheets

(51) Int. Cl.
  *G06F 17/24* (2006.01)
  *G06F 17/28* (2006.01)
  *G06F 17/22* (2006.01)
  *G06F 3/0482* (2013.01)
  *G06F 17/30* (2006.01)

(52) U.S. Cl.
  CPC ......... *G06F17/272* (2013.01); *G06F 17/2785* (2013.01); *G06F 17/28* (2013.01); *G06F 17/2809* (2013.01); *G06F 17/30401* (2013.01); *G06F 17/30445* (2013.01); *G06F 17/30598* (2013.01); *G06F 17/30604* (2013.01); *G06F 17/30864* (2013.01)

(56) References Cited

U.S. PATENT DOCUMENTS

| | | | | |
|---|---|---|---|---|
| 7,761,480 B2 * | 7/2010 | Toledano | .......... | G06F 17/30463 707/804 |
| 7,809,548 B2 * | 10/2010 | Mihalcea | .............. | G06F 17/277 704/1 |
| 8,504,908 B2 * | 8/2013 | Chisholm | ............. | G06F 17/241 715/230 |
| 8,725,739 B2 * | 5/2014 | Liang | ................ | G06F 17/30873 707/740 |
| 2002/0152202 A1 * | 10/2002 | Perro | ................ | G06F 17/30663 |
| 2005/0060140 A1 * | 3/2005 | Maddox | ............ | G06F 17/30684 704/4 |
| 2005/0154690 A1 * | 7/2005 | Nitta | ................... | G06F 17/3061 706/46 |
| 2005/0278325 A1 * | 12/2005 | Mihalcea | ............ | G06F 17/277 |
| 2005/0278362 A1 * | 12/2005 | Maren | .................... | G06N 5/025 |
| 2006/0248458 A1 * | 11/2006 | Li | .................... | G06F 17/30684 715/700 |
| 2012/0011428 A1 * | 1/2012 | Chisholm | ............. | G06F 17/241 715/230 |
| 2014/0195473 A1 * | 7/2014 | Citeau | ................... | G06N 5/022 706/47 |

* cited by examiner

METHODS AND SYSTEMS FOR MODELING COMPLEX TAXONOMIES WITH NATURAL LANGUAGE UNDERSTANDING

CROSS REFERENCES TO RELATED APPLICATIONS

This application claims the benefits of U.S. Provisional Application 62/089,736, filed Dec. 9, 2014, and titled, "METHODS AND SYSTEMS FOR ANNOTATING NATURAL LANGUAGE PROCESSING," U.S. Provisional Application 62/089,742, filed Dec. 9, 2014, and titled, "METHODS AND SYSTEMS FOR IMPROVING MACHINE PERFORMANCE IN NATURAL LANGUAGE PROCESSING," U.S. Provisional Application 62/089,745, filed Dec. 9, 2014, and titled, "METHODS AND SYSTEMS FOR IMPROVING FUNCTIONALITY IN NATURAL LANGUAGE PROCESSING," and U.S. Provisional Application 62/089,747, filed Dec. 9, 2014, and titled, "METHODS AND SYSTEMS FOR SUPPORTING NATURAL LANGUAGE PROCESSING," the disclosures of which are incorporated herein in their entireties and for all purposes.

This application is also related to U.S. patent application Ser. No. 14/964,517, filed Dec. 9, 2015, and titled "METHODS FOR GENERATING NATURAL LANGUAGE PROCESSING SYSTEMS," U.S. patent application Ser. No. 14/964,518, filed Dec. 9, 2015, titled "ARCHITECTURES FOR NATURAL LANGUAGE PROCESSING," U.S. patent application Ser. No. 14/964,520, filed Dec. 9, 2015, and titled "OPTIMIZATION TECHNIQUES FOR ARTIFICIAL INTELLIGENCE," U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE," U.S. patent application Ser. No. 14/964,510, filed Dec. 9, 2015, and titled "METHODS AND SYSTEMS FOR IMPROVING MACHINE LEARNING PERFORMANCE," U.S. patent application Ser. No. 14/964,512, filed Dec. 9, 2015, and titled "AN INTELLIGENT SYSTEM THAT DYNAMICALLY IMPROVES ITS KNOWLEDGE AND CODE-BASE FOR NATURAL LANGUAGE UNDERSTANDING," U.S. patent application Ser. No. 14,964,525, filed Dec. 9, 2015, and titled "METHODS AND SYSTEMS FOR LANGUAGE-AGNOSTIC MACHINE LEARNING IN NATURAL LANGUAGE PROCESSING USING FEATURE EXTRACTION," U.S. patent application Ser. No. 14/964,526, filed Dec. 9, 2015, and titled "METHODS AND SYSTEMS FOR PROVIDING UNIVERSAL PORTABILITY IN MACHINE LEARNING," and U.S. patent application Ser. No. 14/964,528, filed Dec. 9, 2015, and titled "TECHNIQUES FOR COMBINING HUMAN AND MACHINE LEARNING IN NATURAL LANGUAGE PROCESSING," each of which are filed concurrently herewith, and the entire contents and substance of all of which are hereby incorporated in total by reference in their entireties and for all purposes.

TECHNICAL FIELD

The subject matter disclosed herein generally relates to processing data. In some example embodiments, the present disclosures relate to systems and methods for providing percolation of logical hierarchies in natural language processing.

BRIEF SUMMARY

In some embodiments, methods and systems for providing rules percolation of logical hierarchies in natural language processing are presented. In some embodiments, a method may include: accessing, at a first node in a logical hierarchy configured to guide classification of a plurality of documents by the natural language model, at least one rule associated with the first node, said at least one rule defining a first factor for determining whether a document among the plurality of documents is to be classified into the first node; identifying a percolation criterion associated with a second node in the logical hierarchy that is a parent node to the first node, said percolation criterion indicating that the at least one rule associated with the first node is to be associated also with the second node; based on the identified percolation criterion, associating the at least one rule with the second node such that the at least one rule defines a second factor for determining whether the document is to also be classified into the second node; accessing the document for natural language processing; and classifying the document according to the logical hierarchy by determining whether the document is to be classified into at least one of the second node and the first node based on the at least one rule associated with both the first node and the second node.

In some embodiments of the method, the percolation criterion is a first percolation criterion, and the method further comprises: identifying a second percolation criterion associated with a third node in the logical hierarchy that is a parent node to the second node, said percolation criterion indicating that the at least one rule associated with the first node is to be associated also with the third node; and based on the identified second percolation criterion, associating the at least one rule with the third node such that the at least one rule defines a third factor for determining whether the document is to also be classified into the third node.

In some embodiments, the method further comprises: determining that a second percolation criterion is not associated with a third node in the logical hierarchy that is a parent node to the second node; and based on said determination, limiting the at least one rule to be associated only to the first node and the second node.

In some embodiments of the method, the percolation criterion includes the second node being repeated at least once within the logical hierarchy.

In some embodiments of the method, the percolation criterion includes a metadata tag that is enabled.

In some embodiments of the method, classifying the document according to the logical hierarchy comprises analyzing the document utilizing the at least one rule to determine if the document is to be classified into the second node. In some embodiments of the method, classifying the document according to the logical hierarchy further comprises: determining that the document is to be classified into the second node based at least in part on the at least one rule; and based on said determination, analyzing the document utilizing the at least one rule to determine if the document is to be classified into one or more child nodes of the second node, the one or more child nodes including the first node. In some embodiments of the method, determining that the document is to be classified into the second node based at least in part on the at least one rule further comprises: determining at least one region of text within the document that satisfies the first factor specified by the at least one rule; and temporarily storing the at least one region of text in a cache in response to the determination.

In some embodiments, the method further comprises: receiving an input to identify which documents in the plurality of documents are to be classified into the first node; in response to said input, analyzing the plurality of documents by the natural language model, using the at least one rule, to determine which documents are to be classified into the first node; and causing display of the documents that are determined to be classified into the first node. In some embodiments, the method further comprises: causing display of documents that are determined to be classified into the first node, wherein the determination is made at least in part by the document triggering the at least one rule.

In some embodiments, a system for providing rules percolation of logical hierarchies in natural language processing is presented. The system may include: a memory; and a processor coupled to the memory and configured to: access, at a first node in a logical hierarchy configured to guide classification of a plurality of documents by the natural language model, at least one rule associated with the first node, said at least one rule defining a first factor for determining whether a document among the plurality of documents is to be classified into the first node; identify a percolation criterion associated with a second node in the logical hierarchy that is a parent node to the first node, said percolation criterion indicating that the at least one rule associated with the first node is to be associated also with the second node; based on the identified percolation criterion, associate the at least one rule with the second node such that the at least one rule defines a second factor for determining whether the document is to also be classified into the second node; access the document for natural language processing; and classify the document according to the logical hierarchy by determining whether the document is to be classified into at least one of the second node and the first node based on the at least one rule associated with both the first node and the second node.

In some embodiments, a non-transitory computer readable medium for providing rules percolation of logical hierarchies in natural language processing is presented. The computer readable medium may include instructions that, when executed by a processor, cause the processor to perform operations comprising: accessing, at a first node in a logical hierarchy configured to guide classification of a plurality of documents by the natural language model, at least one rule associated with the first node, said at least one rule defining a first factor for determining whether a document among the plurality of documents is to be classified into the first node; identifying a percolation criterion associated with a second node in the logical hierarchy that is a parent node to the first node, said percolation criterion indicating that the at least one rule associated with the first node is to be associated also with the second node; based on the identified percolation criterion, associating the at least one rule with the second node such that the at least one rule defines a second factor for determining whether the document is to also be classified into the second node; accessing the document for natural language processing; and classifying the document according to the logical hierarchy by determining whether the document is to be classified into at least one of the second node and the first node based on the at least one rule associated with both the first node and the second node.

BRIEF DESCRIPTION OF THE DRAWINGS

Some embodiments are illustrated by way of example and not limitation in the figures of the accompanying drawings.

DETAILED DESCRIPTION

Figure 1:
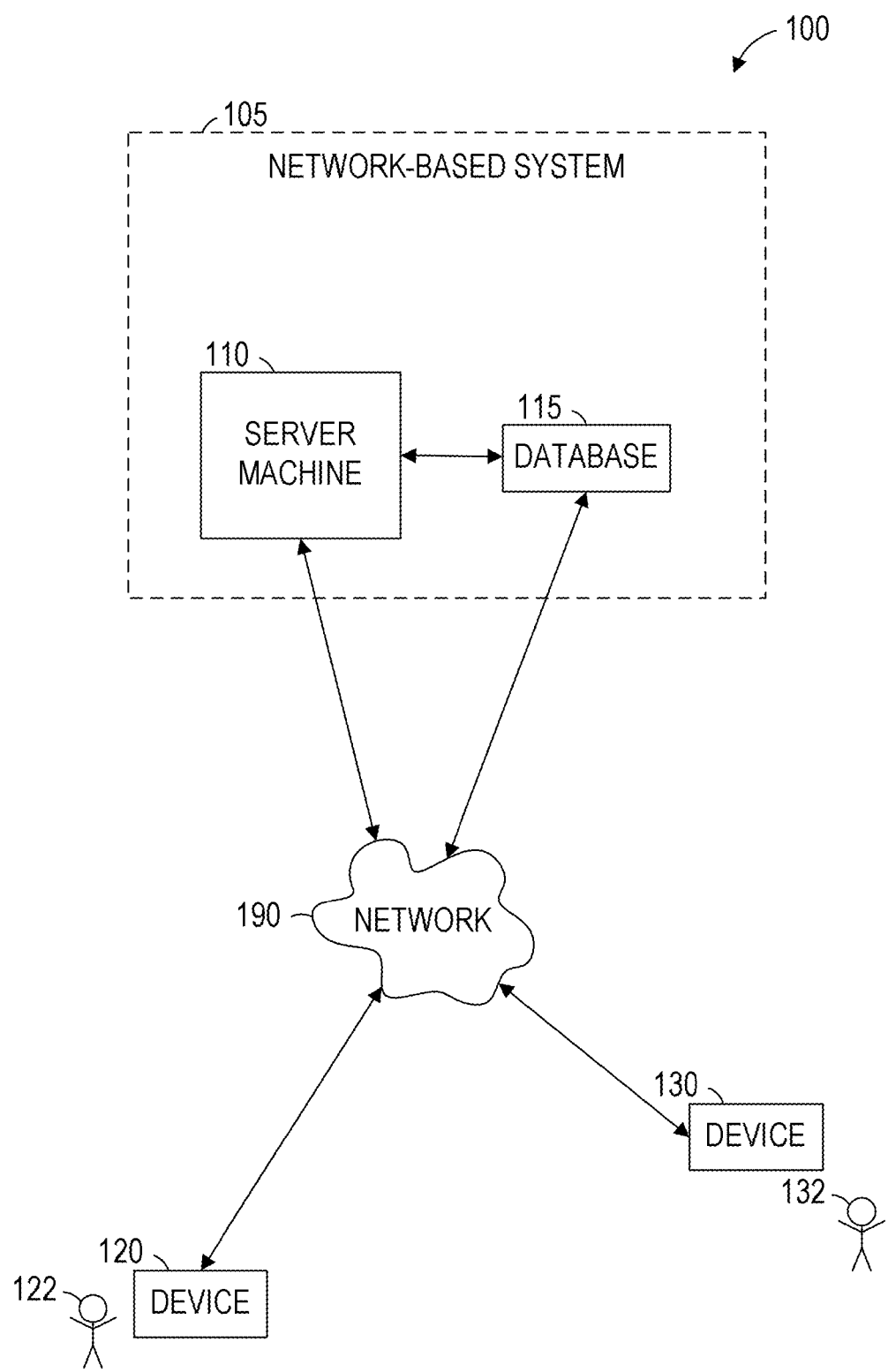
FIG. 1 is a network diagram illustrating an example network environment suitable for aspects of the present disclosure, according to some example embodiments.

Example methods, apparatuses, and systems (e.g., machines) are presented for performing natural language processing techniques using human annotations applied to machine learning techniques of natural language.

Aspects of the present disclosure are presented for the automatic placement of rules applied to topics (referred to as "labels") in a logical hierarchy when conducting natural language processing. A goal of natural language processing is to classify human communications automatically by machine-based engines. Given the millions and even billions of digital communications being generated constantly by humans in the digital age, it is desirable to employ machines to process the communications, interpret them and categorize them in meaningful and organized ways, to make it easier for humans to digest. A natural language model may be trained through a combination of machine learning and rules-based constraints to interpret a specific collection of human communications, such as customer service emails for a telecommunications company, or scholarly journals in biology. Examples of generating these natural language models are described in U.S. patent application Ser. No. 14/964,517, filed Dec. 9, 2015, and titled "METHODS FOR GENERATING NATURAL LANGUAGE PROCESSING SYSTEMS," which is incorporated herein by reference.

When generating these natural language models, it is desirable to define a series of rules for the natural language model to follow, that provide instructions for how the model is to categorize a document based on the appearance of a particular string of characters in the document. For example, a rule may specify that the appearance of the word "happy" in a document may signal to the natural language model that the document should be classified as having a "positive sentiment." In some embodiments, the rules may include a statistical weight, such that multiple rules may be applied to the same document and may be combined to generate a score that overall determines how the document should be classified. Often, these rules are defined by humans and act as forms of "shortcuts" to help the natural language model classify documents based on key words or strings of characters.

In some cases, natural language models utilize the rules to classify the human communications by following a logical hierarchy of topics or categories, which may be referred to as an "ontology." The ontology may be organized in various logical hierarchies, such as a nested tree structure having multiple nodes and sub-nodes (and subsequent sub-levels of sub-nodes underneath ad nausea). Further details of ontologies will be described in more detail below. Each node or sub node in an ontology may be associated with a set of rules that help the natural language model to determine whether a document should be classified into that node.

However, the process for defining rules for each node in the ontology may be quite burdensome and difficult, particularly if each of the rules must be defined manually by one or more human analysts. In addition, it may be desirable to apply the same rule in a sub node to its parent node, if logically it makes sense for the rule in the sub node to also help classify a document as fitting into the parent node. It may be desirable therefore to provide more automatic and efficient ways to define rules for all of the nodes in an ontology that may be used by a natural language model for natural language processing.

Aspects of the present disclosure describe systems and methods for percolating rules defined at lower sub nodes in an ontology up to also be applied to higher nodes in the ontology in a logical and automatic fashion. The disclosures herein may allow for the generation of natural language models to be quicker and more efficient, as conventional methods for generating accurate and reliable natural language models tend to take weeks to months. The disclosures herein may help reduce the amount of manual inputs made to defining rules for all levels in the ontology.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Referring to FIG. 1, a network diagram illustrating an example network environment 100 suitable for performing aspects of the present disclosure is shown, according to some example embodiments. The example network environment 100 includes a server machine 110, a database 115, a first device 120 for a first user 122, and a second device 130 for a second user 132, all communicatively coupled to each other via a network 190. The server machine 110 may form all or part of a network-based system 105 (e.g., a cloud-based server system configured to provide one or more services to the first and second devices 120 and 130). The server machine 110, the first device 120, and the second device 130 may each be implemented in a computer system, in whole or in part, as described below with respect to FIG. 11. The network-based system 105 may be an example of a natural language platform configured to generate natural language models and perform the various functions as described herein. The server machine 110 and the database 115 may be components of the natural language platform configured to perform these functions. While the server machine 110 is represented as just a single machine and the database 115 is represented as just a single database, in some embodiments, multiple server machines and multiple databases communicatively coupled in parallel or in serial may be utilized, and embodiments are not so limited.

Also shown in FIG. 1 are a first user 122 and a second user 132. One or both of the first and second users 122 and 132 may be a human user, a machine user (e.g., a computer configured by a software program to interact with the first device 120), or any suitable combination thereof (e.g., a human assisted by a machine or a machine supervised by a human). The first user 122 may be associated with the first device 120 and may be a user of the first device 120. For example, the first device 120 may be a desktop computer, a vehicle computer, a tablet computer, a navigational device, a portable media device, a smartphone, or a wearable device (e.g., a smart watch or smart glasses) belonging to the first user 122. Likewise, the second user 132 may be associated with the second device 130. As an example, the second device 130 may be a desktop computer, a vehicle computer, a tablet computer, a navigational device, a portable media device, a smartphone, or a wearable device (e.g., a smart watch or smart glasses) belonging to the second user 132. The first user 122 and a second user 132 may be examples of users or customers interfacing with the network-based system 105 to utilize a natural language model according to their specific needs and for providing inputs that the natural language platform utilizes for performing the various functions described herein. In other cases, the users 122 and 132 may be examples of annotators who are supplying annotations to documents to be used for training purposes when developing a natural language model. In other cases, the users 122 and 132 may be examples of analysts who are providing inputs to the natural language platform to more efficiently train the natural language model. The users 122 and 132 may interface with the network-based system 105 through the devices 120 and 130, respectively.

Any of the machines, databases 115, or first or second devices 120 or 130 shown in FIG. 1 may be implemented in a general-purpose computer modified (e.g., configured or programmed) by software (e.g., one or more software modules) to be a special-purpose computer to perform one or more of the functions described herein for that machine, database 115, or first or second device 120 or 130. For example, a computer system able to implement any one or more of the methodologies described herein is discussed below with respect to FIG. 11. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases 115, and devices (e.g., the server machine 110 and the first device 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
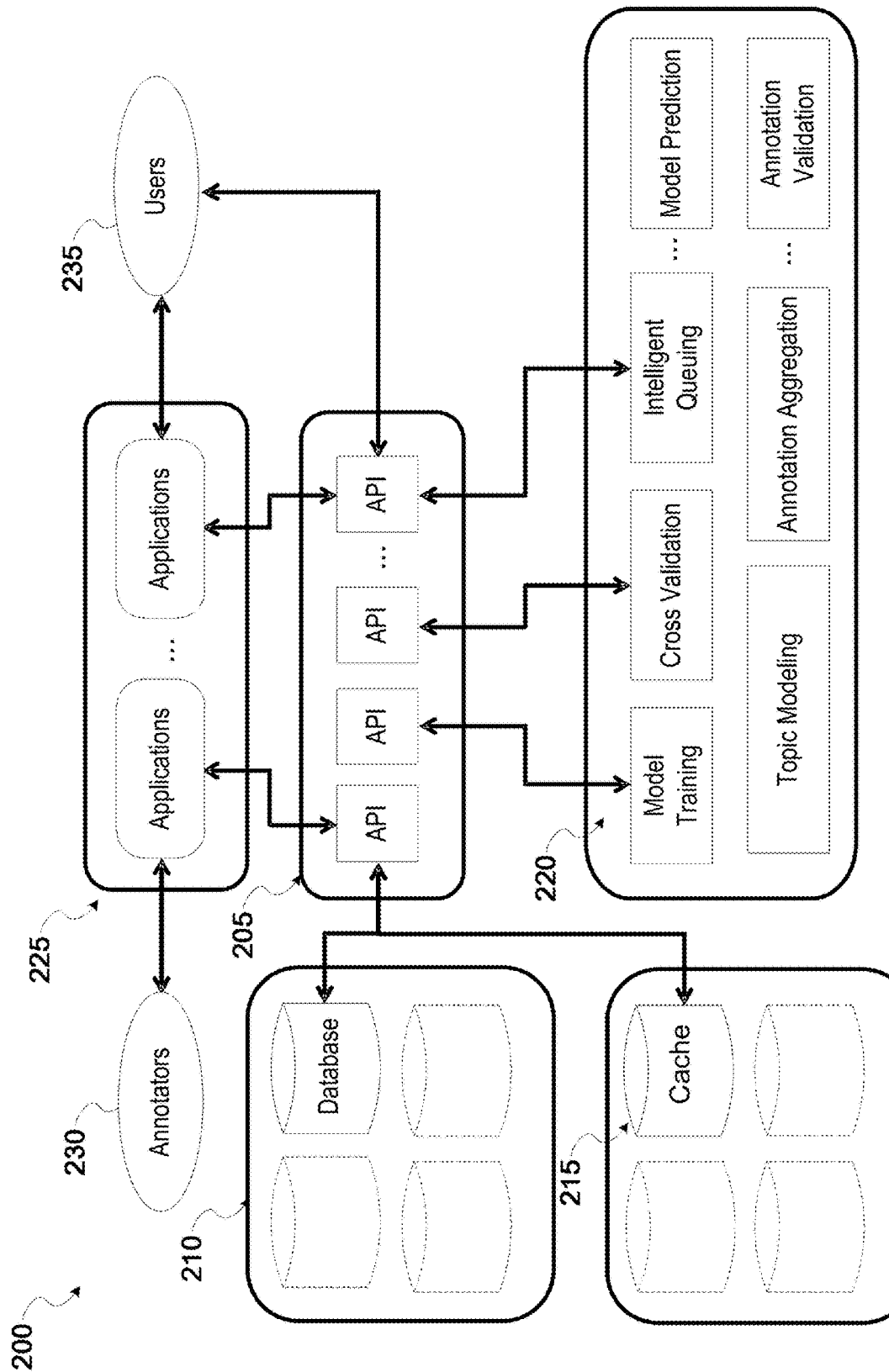
FIG. 2 is a block diagram showing an example system architecture for performing aspects of the present disclosure, according to some example embodiments

Referring to FIG. 2, a diagram 200 is presented showing an example system architecture for performing aspects of the present disclosure, according to some example embodiments. The example system architecture according to diagram 200 represents various data structures and their interrelationships that may comprise a natural language platform, such as the network-based system 105. These various data structures may be implemented through a combination of hardware and software, the details of which may be apparent to those with skill in the art based on the descriptions of the various data structures described herein. For example, an API module 205 includes one or more API processors, where multiple API processors may be connected in parallel. In some example embodiments, the repeating boxes in the diagram 200 represent identical servers or machines, to signify that the system architecture in diagram 200 may be scalable to an arbitrary degree. The API module 205 may represent a point of contact for multiple other modules, includes a database module 210, a cache module 215, background processes module 220, applications module 225, and even an interface for users 235 in some example embodiments. The API module 205 may be configured to receive or access data from database module 210. The data may include digital forms of thousands or millions of human communications. The cache module 215 may store in more accessible memory various information from the database module 210 or from users 235 or other subscribers. Because the database module 210 and cache module 215 show accessibility through API module 205, the API module 205 can also support authentication and authorization of the data in these modules. The background module 220 may be configured to perform a number of background processes for aiding natural language processing functionality. Various examples of the background processes include a model training module, a cross validation module, an intelligent queuing module, a model prediction module, a topic modeling module, an annotation aggregation module, an annotation validation module, and a feature extraction module. These various modules are described in more detail below as well as in U.S. patent application Ser. No. 14/964,520, filed Dec. 9, 2015, and titled "OPTIMIZATION TECHNIQUES FOR ARTIFICIAL INTELLIGENCE"; U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE"; U.S. patent application Ser. No. 14/964,510, filed Dec. 9, 2015, and titled "METHODS AND SYSTEMS FOR IMPROVING MACHINE LEARNING PERFORMANCE"; U.S. patent application Ser. No. 14/964,512, filed Dec. 9, 2015, and titled "AN INTELLIGENT SYSTEM THAT DYNAMICALLY IMPROVES ITS KNOWLEDGE AND CODE-BASE FOR NATURAL LANGUAGE UNDERSTANDING"; U.S. patent application Ser. No. 14/964,525, filed Dec. 9, 2015, and titled "METHODS AND SYSTEMS FOR LANGUAGE-AGNOSTIC MACHINE LEARNING IN NATURAL LANGUAGE PROCESSING USING FEATURE EXTRACTION"; and U.S. patent application Ser. No. 14/964,528, filed Dec. 9, 2015, and titled "TECHNIQUES FOR COMBINING HUMAN AND MACHINE LEARNING IN NATURAL LANGUAGE PROCESSING," each of which are incorporated by reference in their entireties. The API module 205 may also be configured to support display and functionality of one or more applications in applications module 225.

Figure 3:
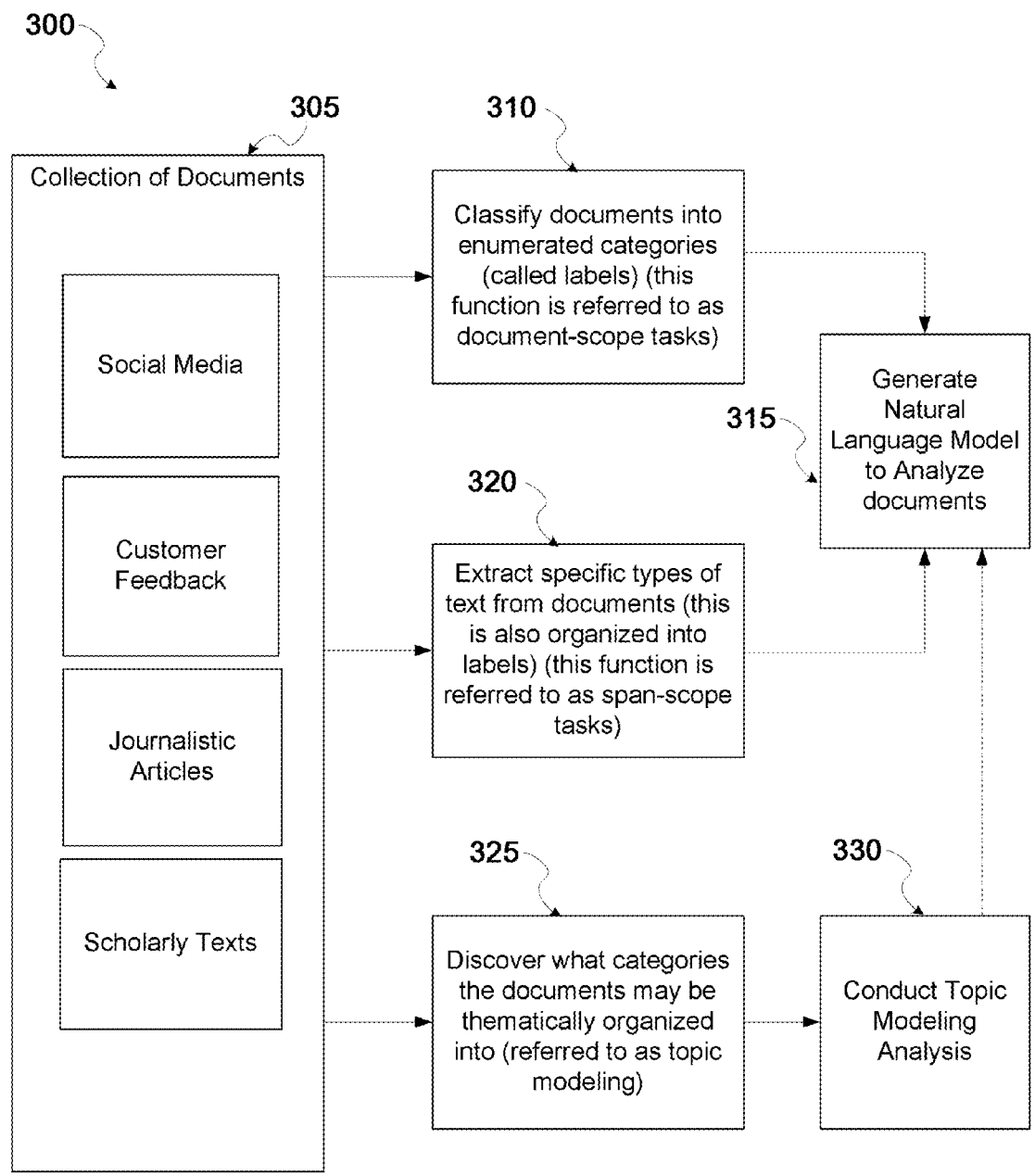
FIG. 3 is a high level diagram showing various examples of types of human communications and what the objectives may be for a natural language model to accomplish, according to some example embodiments.

Referring to FIG. 3, a high level diagram 300 is presented showing various examples of types of human communications and what the objectives may be for a natural language model to accomplish. Here, various sources of data, sometimes referred to as a collection of documents 305, may be obtained and stored in, for example database 115, client data store 155, or database modules 210, and may represent different types of human communications, all capable of being analyzed by a natural language model. Examples of the types of documents 305 include, but are not limited to, posts in social media, emails or other writings for customer feedback, pieces of or whole journalistic articles, commands spoken or written to electronic devices, transcribed call center recordings; electronic (instant) messages; corporate communications (e.g., SEC 10-k, 10-q); confidential documents and communications stored on internal collaboration systems (e.g., SharePoint, Notes), and pieces of or whole scholarly texts.

In some embodiments, at block 310, it may be desired to classify any of the documents 305 into a number of enumerated categories or topics, consistent with some of the descriptions mentioned above. This may be referred to as performing a document-scope task. For example, a user 130 in telecommunications may supply thousands of customer service emails related to services provided by a telecommunications company. The user 130 may desire to have a natural language model generated that classifies the emails into predetermined categories, such as negative sentiment about their Internet service, positive sentiment about their Internet service, negative sentiment about their cable service, and positive sentiment about their cable service. As previously mentioned, these various categories for which a natural language model may classify the emails into, e.g. "negative" sentiment about "Internet service," "positive" sentiment about "Internet service," "negative" sentiment about "cable service," etc., may be referred to as "labels." Based on these objectives, at block 315, a natural language model may be generated that is tailored to classify these types of emails into these types of labels. The natural language model may utilize a logical hierarchy that organizes the labels in a logical manner, referred to herein as an ontology. Example applications of utilizing the ontology by the natural language model will be described more below.

As another example, in some embodiments, at block 320, it may be desired to extract specific subsets of text from documents, consistent with some of the descriptions mentioned above. This may be another example of performing a span-scope task, in reference to the fact that this function focuses on a subset within each document (as previously mentioned, referred to herein as a "span"). For example, a user 130 may desire to identify all instances of a keyword, key phrase, or general subject matter within a novel. Certainly, this span scope task may be applied to multiple novels or other documents. Here too, based on this objective, at block 315, a natural language model may be generated that is tailored to perform this function for a specified number of documents.

As another example, in some embodiments, at block 325, it may be desired to discover what categories the documents may be thematically or topically organized into in the first place, consistent with descriptions above about topic modeling. In some cases, the user 130 may utilize the natural language platform only to perform topic modeling and to discover what topics are most discussed in a specified collection of documents 305. To this end, the natural language platform may be configured to conduct topic modeling analysis at block 330. Topic modeling is discussed in more detail below, as well as in U.S. patent application Ser. No. 14/964,520, filed Dec. 9, 2015, and titled "OPTIMIZATION TECHNIQUES FOR ARTIFICIAL INTELLIGENCE"; U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE"; and U.S. patent application Ser. No. 14/964,528, filed Dec. 9, 2015, and titled "TECHNIQUES FOR COMBINING HUMAN AND MACHINE LEARNING IN NATURAL LANGUAGE PROCESSING," each of which are incorporated herein by reference in their entireties. In some cases, it may be desired to then generate a natural language model that categorizes the documents 305 into these newfound topics. Thus, after performing the topic modeling analysis 230, in some embodiments, the natural language model may also be generated at block 315.

Figure 4:
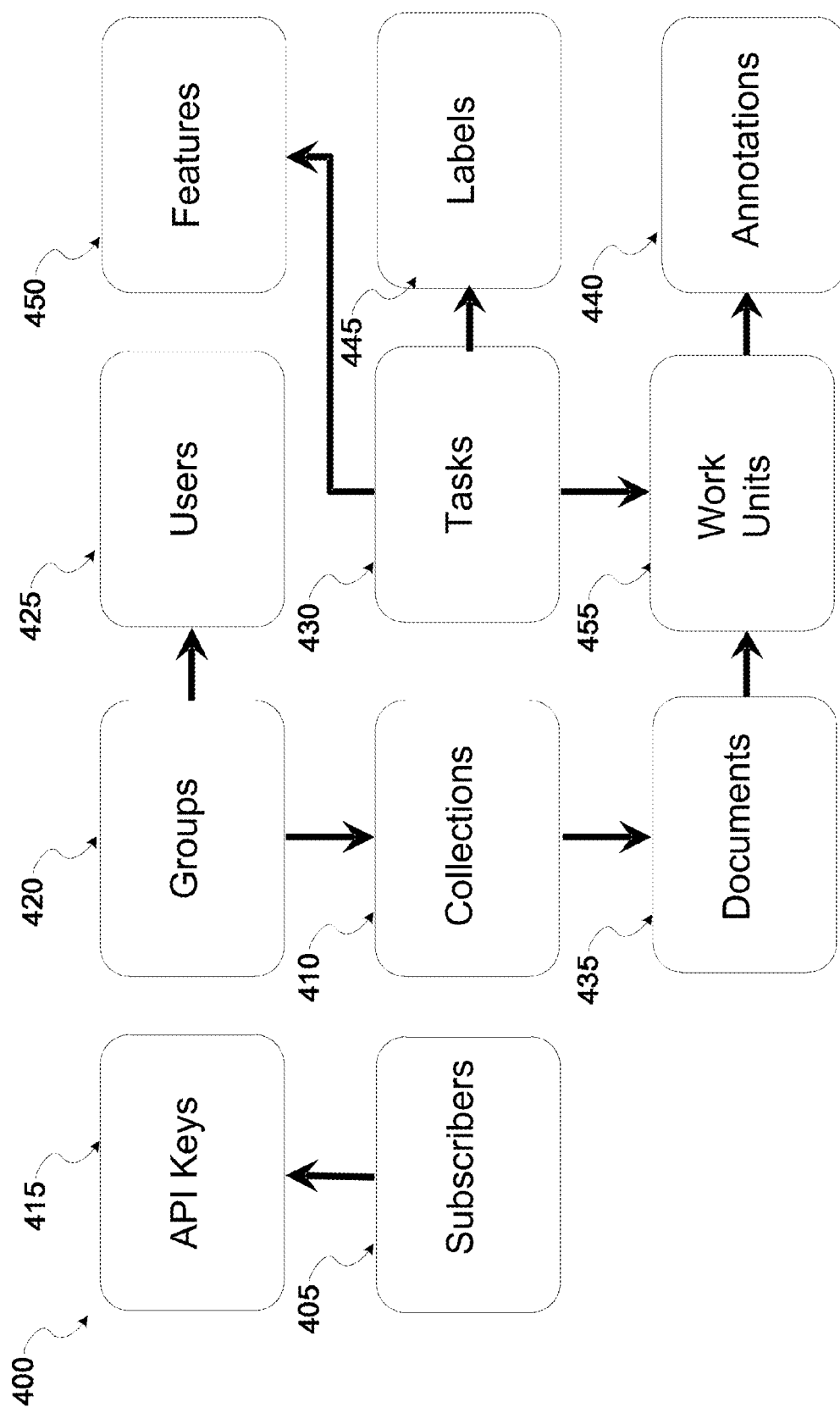
FIG. 4 is a diagram showing an example flowchart for how different data structures within the system architecture may be related to one another, according to some example embodiments.

Referring to FIG. 4, a diagram 400 is presented showing an example flowchart for how different data structures within the system architecture may be related to one another, according to some example embodiments. Here, the collections data structure 410 represents a set of documents 435 that in some cases may generally be homogenous. A document 435 represents a human communication expressed in a single discrete package, such as a single tweet, a webpage, a chapter of a book, a command to a device, or a journal article, or any part thereof. Each collection 410 may have one or more tasks 430 associated with it. A task 430 may be thought of as a classification scheme. For example, a collection 410 of tweets may be classified by its sentiment, e.g. a positive sentiment or a negative sentiment, where each classification constitutes a task 430 about a collection 410. A label 445 refers to a specific prediction about a specific classification. For example, a label 445 may be the "positive sentiment" of a human communication, or the "negative sentiment" of a human communication. In some cases, labels 445 can be applied to merely portions of documents 435, such as paragraphs in an article or particular names or places mentioned in a document 435. For example, a label 445 may be a "positive opinion" expressed about a product mentioned in a human communication, or a "negative opinion" expressed about a product mentioned in a human communication. In some example embodiments, a task may be a sub-task of another task, allowing for a hierarchy or complex network of tasks. For example, if a task has a label of "positive opinion," there might be sub-tasks for types of "positives opinions," like "intention to purchase the project," "positive review," "recommendation to friend," and so on, and there may be subtasks that capture other relevant information, such as "positive features."

Annotations 440 refer to classifications imputed onto a collection 410 or a document 435, often times by human input but may also be added by programmatic means, such as interpolating from available metadata, generated by a pre-existing natural language model, and generated by a topic modeling process. As an example, an annotation 440 applies a label 445 manually to a document 435. In other cases, annotations 440 are provided by users 235 from pre-existing data. In other cases, annotations 440 may be derived from human critiques of one or more documents 435, where the computer determines what annotation 440 should be placed on a document 435 (or collection 410) based on the human critique. In other cases, with enough data in a language model, annotations 440 of a collection 410 can be derived from one or more patterns of pre-existing annotations found in the collection 410 or a similar collection 410.

In some example embodiments, features 450 refer to a library or collection of certain key words or groups of words that may be used to determine whether a task 430 should be associated with a collection 410 or document 435. Thus, each task 430 has associated with it one or more features 450 that help define the task 430. In some example embodiments, features 450 can also include a length of words or other linguistic descriptions about the language structure of a document 435, in order to define the task 430. For example, classifying a document 435 as being a legal document may be based on determining if the document 435 contains a threshold number of words with particularly long lengths, words belonging to a pre-defined dictionary of legal-terms, or words that are related through syntactic structures and semantic relationships. In some example embodiments, features 450 are defined by code, while in other cases features 450 are discovered by statistical methods. In some example embodiments, features 450 are treated independently, while in other cases features 450 are networked combinations of simpler features that are used in combination utilizing techniques like "deep-learning." In some example embodiments, combinations of the methods described herein may be used to define the features 450, and embodiments are not so limited. One or more processors may be used to identify in a document 435 the words found in features data structure 450 to determine what task should be associated with the document 435.

In some example embodiments, a work unit's data structure 455 specifies when humans should be tasked to further examine a document 425. Thus, human annotations may be applied to a document 435 after one or more work units 455 is applied to the document 435. The work units 455 may specify how many human annotators should examine the document 435 and in what order of documents should document 435 be examined. In some example embodiments, work units 455 may also determine what annotations should be reviewed in a particular document 435 and what the optimal user interface should be for review.

In some example embodiments, the data structures 405, 415, 420 and 425 represent data groupings related to user authentication and user access to data in system architecture. For example, the subscribers block 405 may represent users and associated identification information about the users. The subscribers 405 may have associated API keys 415, which may represent one or more authentication data structures used to authenticate subscribers and provide access to the collections 410. Groups 420 may represent a grouping of subscribers based on one or more common traits, such as subscribers 405 belonging to the same company. Individual users 425 capable of accessing the collections 410 may also result from one or more groups 420. In addition, in some cases, each group 420, user 425, or subscriber 405 may have associated with it a more personalized or customized set of collections 510, documents 435, annotations 440, tasks, 430, features 450, and labels 445, based on the specific needs of the customer.

Figure 5:
FIG. 5 shows a portion of an example ontology organized in a hierarchical logical structure, and is used to describe an example of how aspects of the present disclosure automatically apply rules defined in lower sub-nodes to higher parent nodes where appropriate.

Referring to FIG. 5, illustration 500 shows a portion of an example ontology organized in a hierarchical logical structure. This example ontology will be used to describe an example of how aspects of the present disclosure automatically apply rules defined in lower sub-nodes to higher parent nodes where appropriate.

In this example ontology, a number of characteristics are worth noting for purposes of this disclosure. For example, the ontology includes a top level node that includes under it the remaining nested structure of other categories. Multiple nested levels of sub nodes are present, such that a natural language model utilizing this ontology may need to traverse multiple levels from the top down before determining ultimately under what node a document should be classified. Among these multiple levels are some labels that are repeated at an upper and lower level. In many other cases, labels are not repeated. For example, the "Production" label is repeated, with sub-labels of "Costumes/Makeup," "Set Design," and "Special Effects" underneath.

Figure 6:
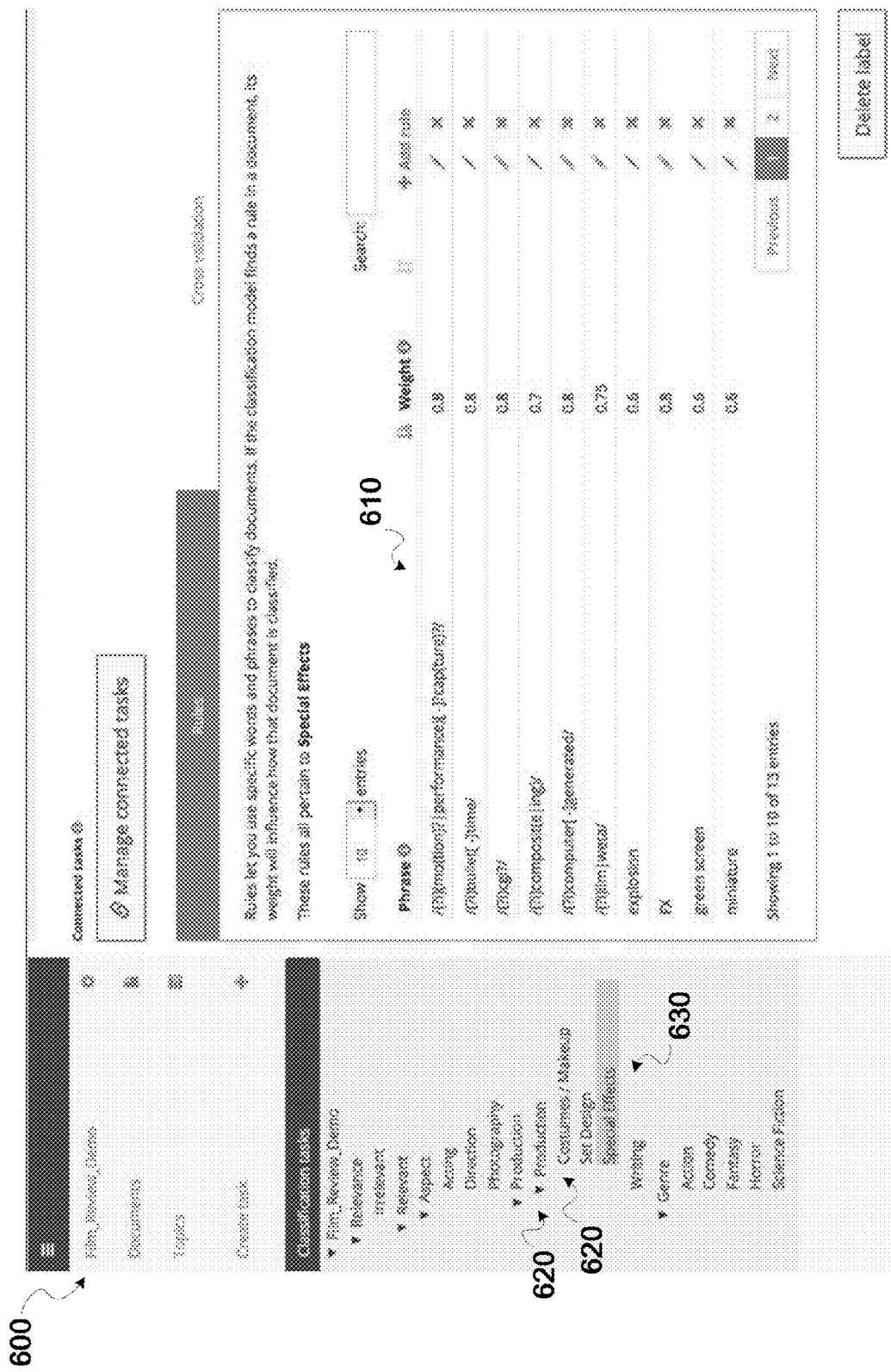
FIG. 6 shows an example interface for associating rules to one node within the example ontology of FIG. 5, according to some embodiments.

Referring to FIG. 6, illustration 600 shows an example interface for associating rules to one node within the example ontology of FIG. 5. The concept of the percolation of rules up the hierarchy of nodes in the ontology will be described here.

In the bottom left pane of the example interface 600 is the ontology as shown in FIG. 5. In the main pane, a list of rules 610 is shown. Here, the list of rules 610 is shown as pertaining to a particular node in the ontology, in this case "Special Effects" 630, as shown in the main pane. The "Special Effects" label 630 in the ontology in the bottom left pane is shown under the "Production" label 620. The rules 610 each include a phrase and a statistical weight, as shown. Some of the phrases include notation indicating that phrase may be included as part of a larger phrase or word, or that the phrase may be broken up into multiple parts with extraneous characters in between. This means that when the natural language model is classifying a document, starting from the top of the ontology hierarchy, and reaches the "Production" label 620 that includes the "Special Effects" sub-node label 630, if the document contains the conditions specified in the phrases shown in the list of rules 610, then the document is assigned a score according to the weight associated with the matching phrase. These weights may then be combined into a composite score according to a weighting algorithm and compared against a threshold value. If the threshold value is satisfied, then the natural language model determines that said document should be classified under the "Special Effects" label 630. This classification process may continue to see if the document should be further classified under any sub nodes of the "Special Effects" label, although in this case the ontology shows that there are no lower nodes. Thus, the analysis for this particular document may complete.

The rules 610 as shown in the main pane may be defined manually. An interface may allow analysts to enter a phrase and assign a weight (e.g., from 0 to 1) to build a list of rules at the node in question. In addition, other rules may be imported from outside sources, such as from client databases and other pre-existing natural language models. Typically, the rules are defined at the very lowest levels of the hierarchy of the ontology, as it is expected that the documents should ultimately be classified into at least one of the lowest levels of the hierarchy. In other words, if there exists a sub node label in the ontology after the natural language model determines that a document should be classified into the parent node, then the natural language model continues classifying the document based on the sub node labels. This would continue until there are there are no lower levels in the hierarchy to traverse. Thus, it would be natural and is typically conventional to define rules at the lowest levels.

However, it may also be desirable to define rules at any of the parent nodes in the hierarchical ontology. The rules applied to the parent nodes may be used in a similar analysis for traversing down the hierarchical ontology when classifying a document. At least some of these rules may also be defined manually or may be imported, in a process similar to that described in FIG. 6.

In addition, it may be logical to associate the list of rules in the lowest level with parent nodes. For example, it may be logical to associate the list of rules 610 not only with the lowest sub-node 630 of "Special Effects," but also with its parent node "Production" 620, and maybe even with higher parent nodes. This is because the rules defined at a lower level may also logically apply to labels in upper levels. For example, the phrases in rules 610 associated with "Special Effects" may also describe documents pertaining to "Production," and therefore the same rules defined at the lower level should apply to the upper level (e.g., the rule associating "green screen" with Special Effects may also be useful for classifying the document as one belonging to Production). In addition, it may also make sense to apply the same rules of "Special Effects" to classify a document as belonging to an even higher level. Thus, it may be desirable to have the list 610 apply not only to the Special Effects label, but multiple higher levels in the ontology hierarchy.

Rather than manually copy each of the rules 610 into upper levels, in some embodiments, the natural language platform interface may be configured to automatically percolate the rules in lower levels of nodes to be applied to upper levels of nodes appropriately and logically. For example, the natural language platform may be configured to identify a tag or other criterion in a higher level of the ontology, and based on that, automatically include the rules in the lower level to said higher level. Furthermore, if the same tag or similar criterion is identified in the very next higher level of the hierarchy, the list of rules in the lower level may also be included in said next higher level. This may continue up the hierarchy of the ontology until the tag or other similar criterion is no longer found in the higher level nodes.

In this example of illustration 600, the indication to percolate the list of rules 610 up the logical hierarchy is based on the double naming of a node, such as "Production" 620, as shown. Thus, the rules 610 as originally defined in the "Special Effects" label 630 are automatically copied into the Production label 620 for use in determining by the natural language model whether a document should be classified at this level. Furthermore, if the next higher level above Production 620 also included the double naming convention, said next higher level would also include the list of rules 610 from the Special Effects label 630, such that the natural language model will also use these rules in its analysis to determine whether a document should be classified at that level.

Other example tags or criteria for indicating to percolate the rules up the logical hierarchical ontology may include a metadata flag that is turned on or enabled when the ontology is being created, categorical rules within the ontology itself that define when rules should be percolated up the hierarchy, and machine learning techniques that learn whether the inclusion of some rules into higher levels improves performance of the natural language model.

Figure 7:
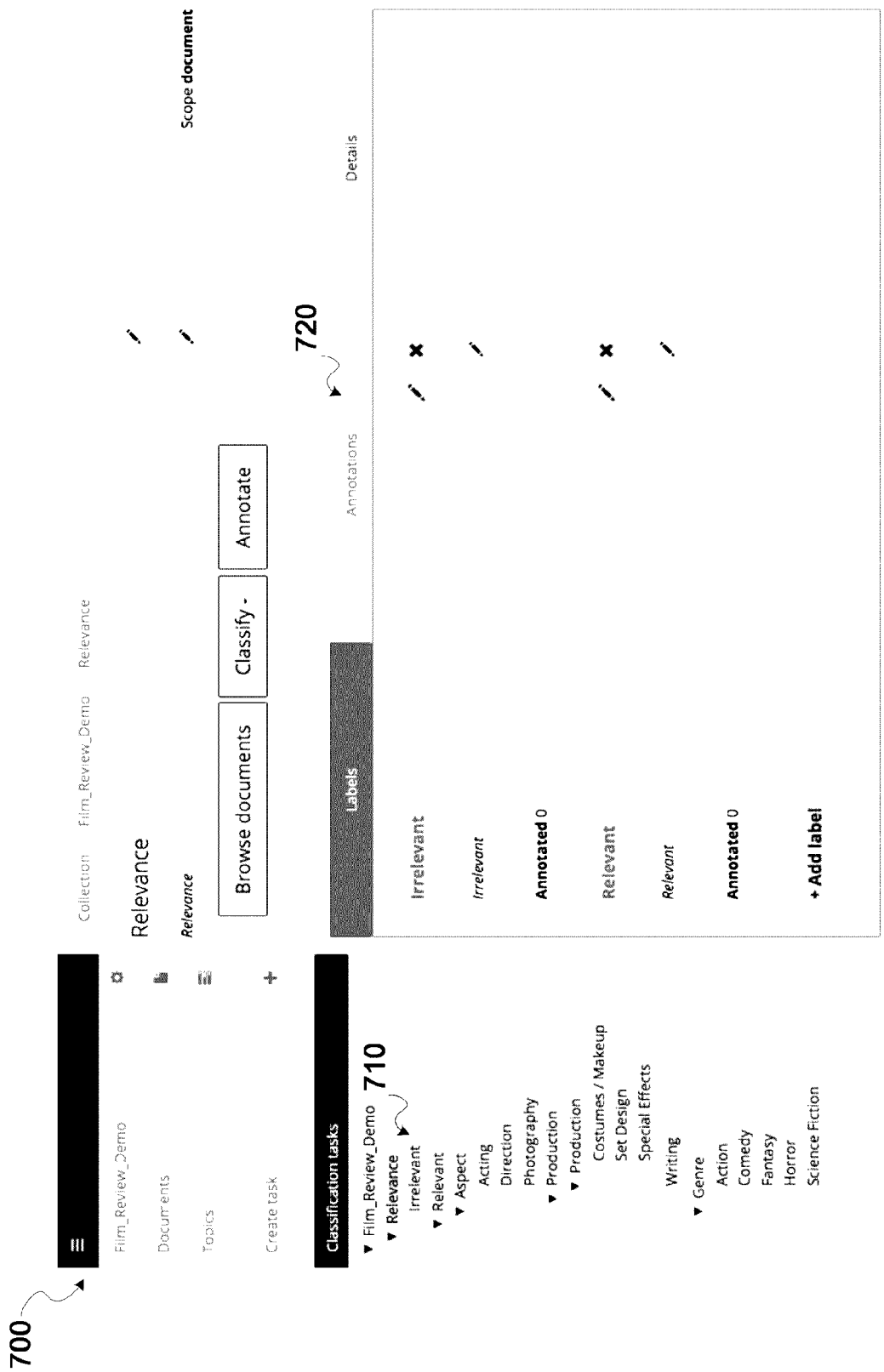
FIG. 7 shows another example screenshot for information about a different section of the ontology that does not include the previous list of rules, according to some embodiments.

Referring to FIG. 7, illustration 700 shows another example screenshot for information about a different section of the ontology that does not include the previous list of rules. Here, toward the highest levels of the logical hierarchy of the ontology, the labels "Relevant" and "Irrelevant" 710 do not include the previous list of rules 610 pertaining to "Special Effects." For example, the main pane 720 does not show any of the rules 610 included in the list of rules. This is also due to the fact that, according to the previously mentioned indicators, the labels "Relevant" and "Irrelevant" are not repeated twice in the ontology as shown in the bottom left pane. Furthermore, it may desirable to not percolate the list of rules continually up all levels of the hierarchical ontology because it may not be logical to do so. For example, in determining whether a document is "relevant" or "irrelevant" to the ontology in question (here, it is "Film_Review_Demo"), documents containing certain words or phrases more specific to "Special Effects" may not be helpful. For example, a document that includes a news report about "gas pipe explosion" would not be deemed relevant for this ontology, although "explosion" is a phrase that would ultimately help classify the document under "Special Effects," assuming the document was first deemed to be "Relevant" and was classified further down the sub-levels of that hierarchy. Thus, it makes sense that the percolation of rules be limited to only so many levels, the determination of which is made possible according to aspects of the present disclosure.

Figure 8:
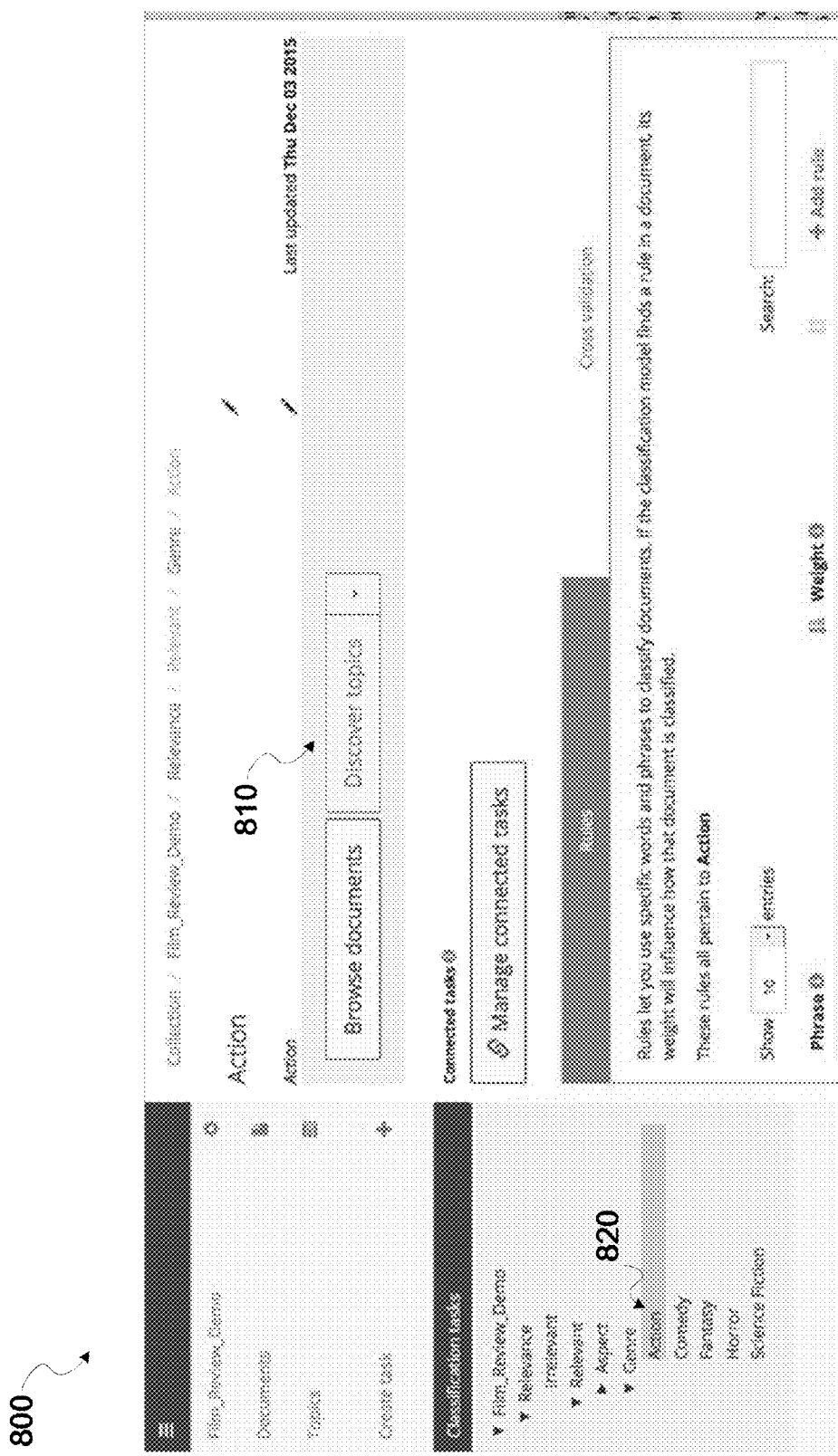
FIG. 8 shows additional functionality for discovering topics that may be included after the ontology is completed, in part through the percolation of rules, according to some embodiments.

Referring to FIG. 8, illustration 800 shows additional functionality for discovering topics that may be included after the ontology is completed, in part through the percolation of rules, according to some embodiments. Once the ontology is fully defined and settled, and after the natural language model is trained (for additional details for how a natural language model is trained, refer to U.S. patent application Ser. No. 14/964,517, filed Dec. 9, 2015, and titled "METHODS FOR GENERATING NATURAL LANGUAGE PROCESSING SYSTEMS," which again is incorporated herein by reference), the natural language model may classify documents according to the organizational structure of the ontology. Ordinarily, the natural language model may access many documents in a collection and categorize them into one or more labels (i.e., the nodes in the ontology). In some cases, however, it may be desirable by a client or user to be informed about what kinds of documents are categorized into a particular label, rather than to have the natural language model classify all documents into multiple labels.

Aspects of the present disclosure allow for this specific "discover topics" functionality, by providing to the client or user only those particular documents that fall into a specified label in the ontology. For example, a user may select in an interface menu of illustration 800 the "Discover topics" button 810, when the "Action" label 820 is selected. By selecting this feature, the natural language model may be configured to analyze the documents in the collection and provide only those documents that traverse through the ontology and ultimately end at the "Action" label 820, as shown in the example ontology on the bottom-left pane. In this way, some processing may be reduced by limiting the amount of processing performed on other documents that do not fit into the "Action" label 820. For example, if when traversing the hierarchical ontology, starting from the top node of "Film_Review_Demo," it is determined that a document falls under the label of "irrelevant," then the analysis can stop and the next document may be processed. As another example, if it is determined that a document falls under the label of "relevant" but does not fall under the label of "Genre," then the analysis also can stop and the next document may be processed. In addition, this functionality allows a user to specifically identify examples of particular labels of interest, and streamlines the amount of information the user has to wait for before accessing that information.

In some embodiments, the processing to allow for this "discover topics" functionality may be aided by the caching of documents already classified by the natural language model. For example, the discover topics functionality may be enabled during or after the natural language model has already analyzed a number of documents and classified them. These results may already be stored in a database and may be available for display. Any documents already classified under the desired label may be readily available for display therefore.

In some embodiments, the discover topics functionality may be available after conducting the percolation of rules and solidifying the structure of the ontology in general. In other cases, the percolation of rules up the hierarchy may not be necessary in order to solidify the ontology before utilizing the discover topics functionality.

Figure 9:
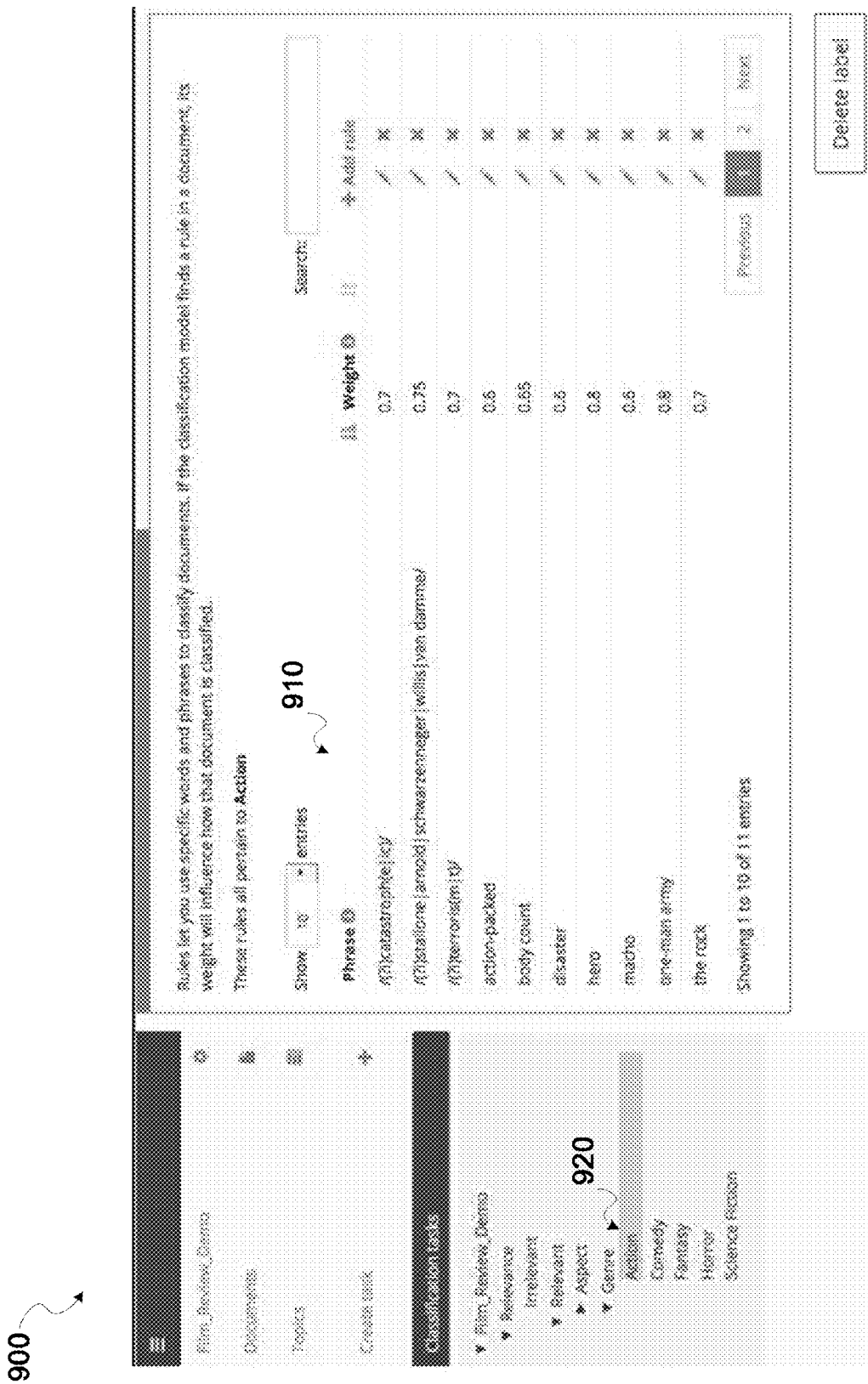
FIG. 9 shows an example screenshot of additional functionality, whereby the discover topics functionality may also be indexed by the rules present for that particular label, according to some embodiments.

Referring to FIG. 9, illustration 900 shows an example screenshot of additional functionality, whereby the discover topics functionality may also be indexed by the rules present for that particular label, according to some embodiments. The natural language model may be configured to attribute a classified document to the factors the resulted in its classification, such as what rules were triggered. Metadata may be appended to the document that records these determinations once classified and may be stored in a database. In this way, for example, each rule in the rules list 910 may be selected during a discover topics function, and documents classified according to said rule may be presented in the display. In this example of FIG. 9, the rules list 910 is associated with the "Action" label 920. Each of the rules may be used to index the documents, whereby clicking on a rule may then cause display of all of the documents that were classified at least in part by that rule. In some cases, the documents may appear under multiple rules, since more than one rule may have contributed to the document's classification. In other examples, the documents may be displayed and the phrases of each rule used to classify said document may be indicated with the document. In this way, the interface may show all of the different rules triggered to classify the document.

Figure 10:
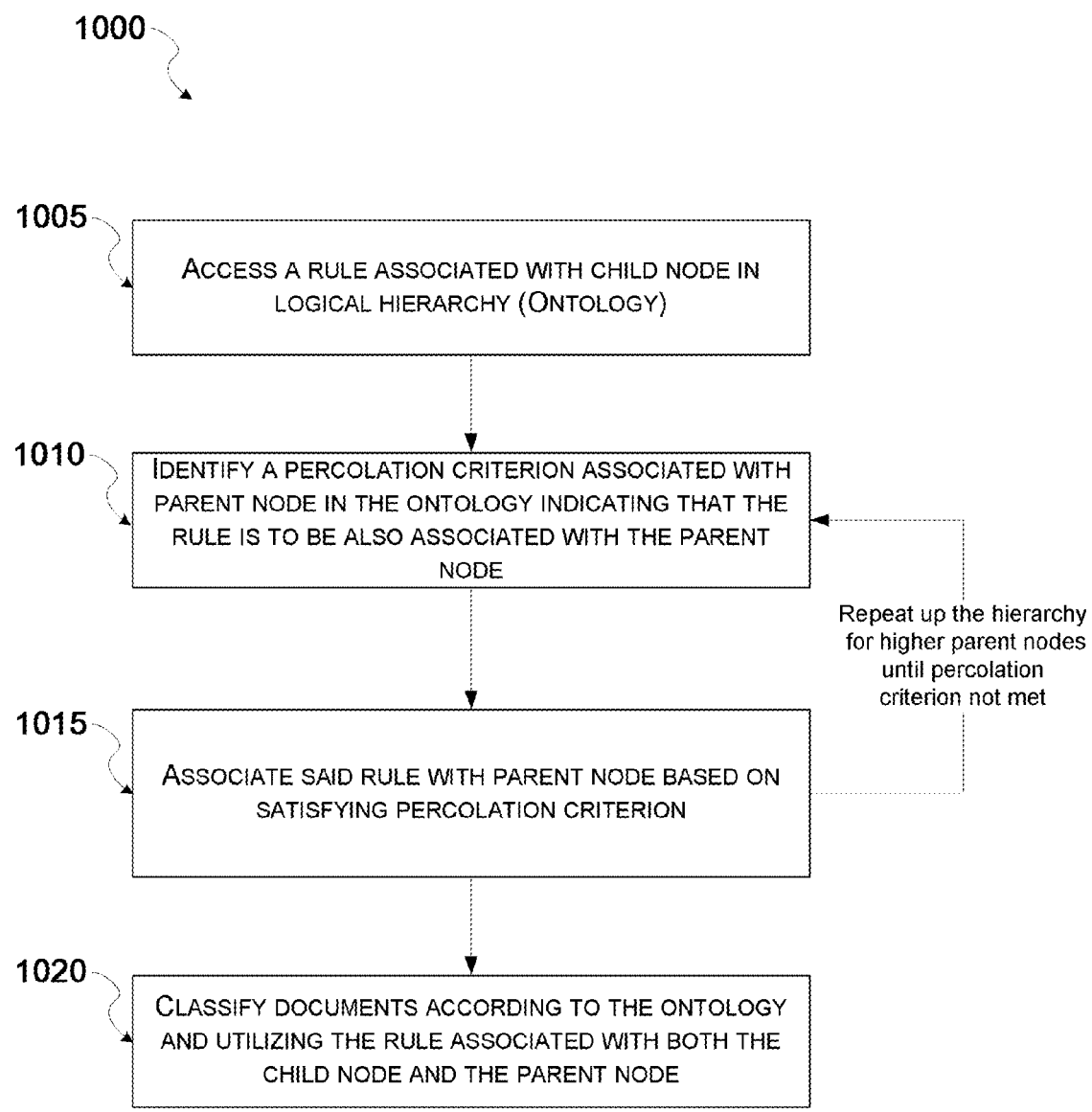
FIG. 10 describes an example methodology for automatically associating rules applied to a child node in a logical hierarchy to one or more parent nodes in the hierarchy, according to some embodiments.

Referring to FIG. 10, flowchart 1000 describes an example methodology for automatically associating rules applied to a child node in a logical hierarchy to one or more parent nodes in the hierarchy, according to some embodiments. The example description herein may be consistent with the various descriptions in the previous figures. The example methodology may be performed by a natural language platform configured to generate a natural language model and utilize the natural language model to classify a collection of documents, such as the network-based system 105 and the more detailed system architecture 200.

At block 1005, the natural language platform may be configured to access a rule associated with a child node in a logical hierarchy, also referred to herein as an ontology. The rule may help define a factor or criterion for determining whether a document should be classified into the child node. An example factor or criterion may include applying a weight to the child node if the phrase associated with the rule is found in the document being classified. Examples and example properties of the logical hierarchy may include the various descriptions of various ontologies described herein. The natural language platform may access the rule based on a user defining the rule in a user interface associated with the child node. It is noted that the rule may first be associated with the child node before being associated with any other node in the ontology.

At block 1010, the natural language platform may be configured to identify a percolation criterion associated with a parent node in the ontology indicating that the rule associated with the child node is also to be associated with the parent node. An example of a percolation criterion is that the name of the parent node is repeated at different levels within the ontology. Examples of this type of percolation criterion are described in the previous figures. Another example includes the inclusion of a metadata tag associated with the parents node that signals that all rules in the lower children nodes should be also associated with the parent node. In some cases, these percolation criteria may be specified by the user and inputted into a user interface of the natural language platform. In other cases, the natural language platform may employ machine learning methods to learn when rules in the children nodes should be associated with the parent nodes.

At block 1015, the natural language platform may be configured to associate the rule originally with the child node to be with the parents node based on satisfying or identifying the percolation criterion. Intermediate operations may include automatically copying the rule from the child node and duplicating it into the parent node, and also making the rule displayable when the user surveys information about the parent node.

In some embodiments, this process of percolating a rule up higher levels in the logical hierarchy may continue for subsequent parent nodes for all subsequent parent nodes that satisfy the percolation criterion or at least have the percolation criterion present. Thus, the example methodology may cycle back to block 1010 from block 1015, and may repeat the process until a percolation criterion associated with the next higher parents node is no longer met or is not present. An example of the rule in the lowest child node not percolating up the entire logical hierarchy is described in FIG. 7.

In general, this example methodology may be applied for every rule in every child node of the logical hierarchy. Thus, after this process is completed for each and all rules that may be defined, at block 1020, the natural language model may be configured to classify documents according to the ontology and based on utilizing the at least one rule described in the present methodology that is associated with both the child node and the parent node. Of course, said rule may also be associated with higher parent nodes, and embodiments are not so limited. In addition, other rules may also be afforded the same treatment, and the present methodology is not limited to just a single rule.

In some embodiments, the process of applying a percolated rule to a document involves identifying the regions of text within the document that match the criteria specified by the rule. Because percolated rules may need to be applied to multiple nodes in the ontology, and because rule application may be computationally intensive, it is desirable to store these matching regions in a cache associated with the document and the rule to avoid the full rule application computation for each such percolated node. In some embodiments, this cache may use a hash function of the document content and metadata, such as the Secure Hash Algorithm 2 (SHA-2), to identify such cached documents. The matching regions may be stored in any suitable memory, including the API server's local memory, a distributed in-memory caching server such as Redis or memcached, or in a persistent database.

In some embodiments, the methodology may also include employing the discover topics functionality described in FIG. 8. This functionality may be employed after the ontology is well defined based at least in part on any percolation of rules where applicable. In some embodiments, the discover topics functionality may be indexed according to the various rules associated with the label in question. An example of indexing according to the rules as described in FIG. 9.

Figure 11:
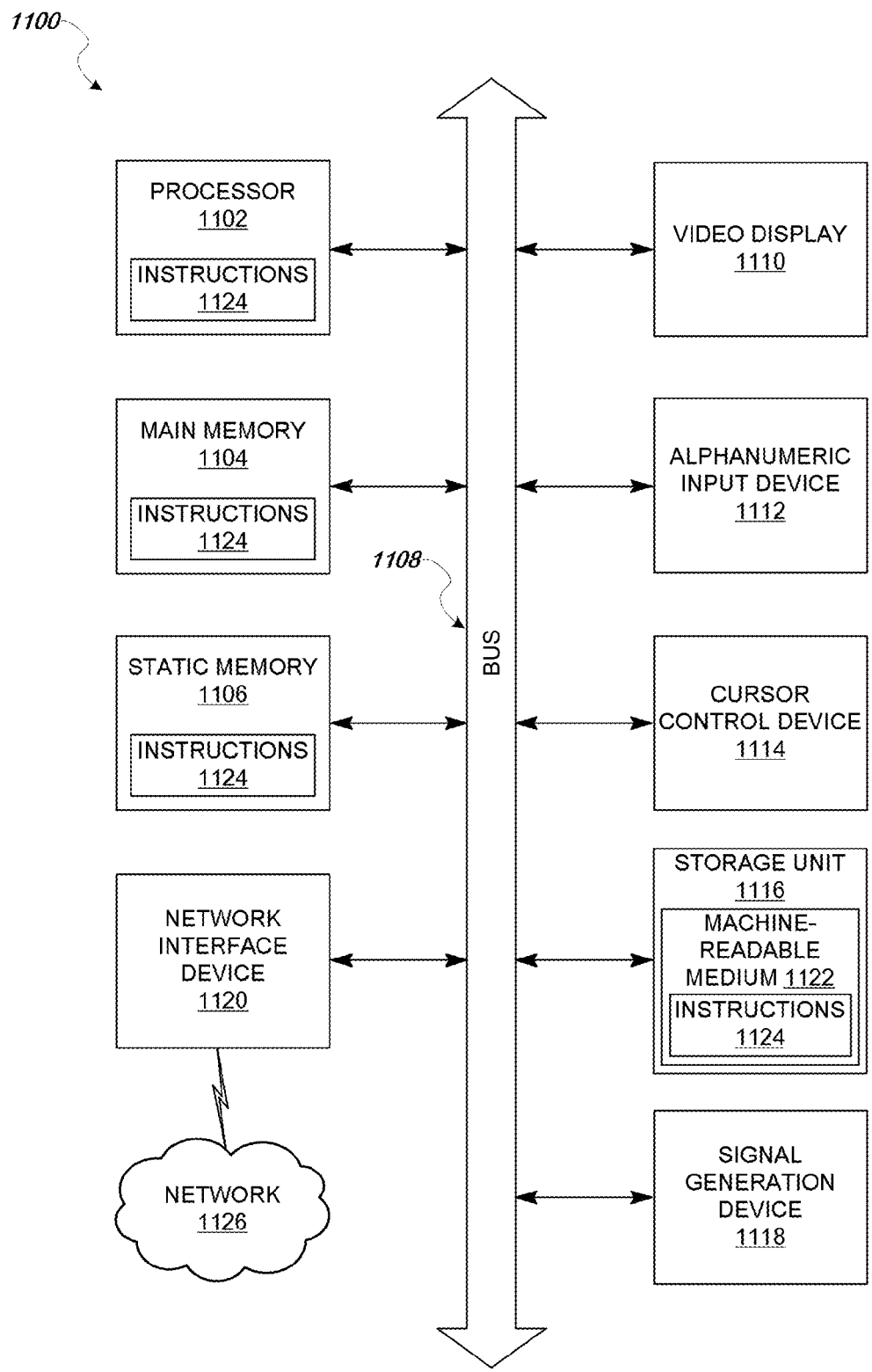
FIG. 11 is a block diagram illustrating components of a machine, according to some example embodiments, able to read instructions from a machine-readable medium and perform any one or more of the methodologies discussed herein.

Referring to FIG. 11, the block diagram illustrates components of a machine 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be connected (e.g., networked) to other machines. In a networked deployment, the machine 1100 may operate in the capacity of a server machine 110 or a client machine in a server-client network environment, or as a peer machine in a distributed (e.g., peer-to-peer) network environment. The machine 1100 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine 1100 is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a video display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein, including, for example, any of the descriptions of FIGS. 1-10. The instructions 1124 may also reside, completely or at least partially, within the main memory 1104, within the processor 1102 (e.g., within the processor's cache memory), or both, before or during execution thereof by the machine 1100. The instructions 1124 may also reside in the static memory 1106.

Accordingly, the main memory 1104 and the processor 1102 may be considered machine-readable media 1122 (e.g., tangible and non-transitory machine-readable media). The instructions 1124 may be transmitted or received over a network 1126 via the network interface device 1120. For example, the network interface device 1120 may communicate the instructions 1124 using any one or more transfer protocols (e.g., HTTP). The machine 1100 may also represent example means for performing any of the functions described herein, including the processes described in FIGS. 1-10.

In some example embodiments, the machine 1100 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1122 able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database 115, or associated caches and servers) able to store instructions 1124. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device 120 or 130, as well as cloud-based storage systems or storage networks that include multiple storage apparatus or devices 120 or 130. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 1122 is non-transitory in that it does not embody a propagating signal. However, labeling the tangible machine-readable medium 1122 as "non-transitory" should not be construed to mean that the medium is incapable of movement; the medium should be considered as being transportable from one physical location to another. Additionally, since the machine-readable medium 1122 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1122 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1102 or a group of processors 1102) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1102 or other programmable processor 1102. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 1108) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions described herein. As used herein, "processor-implemented module" refers to a hardware module implemented using one or more processors 1102.

Similarly, the methods described herein may be at least partially processor-implemented, a processor 1102 being an example of hardware. For example, at least some of the operations of a method may be performed by one or more processors 1102 or processor-implemented modules. As used herein, "processor-implemented module" refers to a hardware module in which the hardware includes one or more processors 1102. Moreover, the one or more processors 1102 may also operate to support performance of the relevant operations in a "cloud computing" environment or as a "software as a service" (SaaS). For example, at least some of the operations may be performed by a group of computers (as examples of machines 1100 including processors 1102), with these operations being accessible via a network 1126 (e.g., the Internet) and via one or more appropriate interfaces (e.g., an API).

The performance of certain operations may be distributed among the one or more processors 1102, not only residing within a single machine 1100, but deployed across a number of machines 1100. In some example embodiments, the one or more processors 1102 or processor-implemented modules may be located in a single geographic location (e.g., within a home environment, an office environment, or a server farm). In other example embodiments, the one or more processors 1102 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 1100 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for improving natural language processing conducted by a natural language model, the method comprising:
    accessing, at a first node in a logical hierarchy configured to guide classification of a plurality of documents by the natural language model, at least one rule associated with the first node, said at least one rule defining a first factor for determining whether a document among the plurality of documents is to be classified into the first node;
    identifying a percolation criterion associated with a second node in the logical hierarchy that is a parent node to the first node, said percolation criterion indicating that the at least one rule associated with the first node is to be associated also with the second node;
    based on the identified percolation criterion, associating the at least one rule with the second node such that the at least one rule defines a second factor for determining whether the document is to also be classified into the second node;
    accessing the document for natural language processing; and
    classifying the document according to the logical hierarchy by determining whether the document is to be classified into at least one of the second node and the first node based on the at least one rule associated with both the first node and the second node.

2. The method of claim 1, wherein the percolation criterion is a first percolation criterion, and the method further comprises:
    identifying a second percolation criterion associated with a third node in the logical hierarchy that is a parent node to the second node, said percolation criterion indicating that the at least one rule associated with the first node is to be associated also with the third node; and
    based on the identified second percolation criterion, associating the at least one rule with the third node such that the at least one rule defines a third factor for determining whether the document is to also be classified into the third node.

3. The method of claim 1, further comprising:
    determining that a second percolation criterion is not associated with a third node in the logical hierarchy that is a parent node to the second node; and
    based on said determination, limiting the at least one rule to be associated only to the first node and the second node.

4. The method of claim 1, wherein the percolation criterion includes the second node being repeated at least once within the logical hierarchy.

5. The method of claim 1, wherein the percolation criterion includes a metadata tag that is enabled.

6. The method of claim 1, wherein classifying the document according to the logical hierarchy comprises analyzing the document utilizing the at least one rule to determine if the document is to be classified into the second node.

7. The method of claim 6, wherein classifying the document according to the logical hierarchy further comprises:
determining that the document is to be classified into the second node based at least in part on the at least one rule; and
based on said determination, analyzing the document utilizing the at least one rule to determine if the document is to be classified into one or more child nodes of the second node, the one or more child nodes including the first node.

8. The method of claim 7, wherein determining that the document is to be classified into the second node based at least in part on the at least one rule further comprises:
determining at least one region of text within the document that satisfies the first factor specified by the at least one rule; and
temporarily storing the at least one region of text in a cache in response to the determination.

9. The method of claim 1, further comprising:
receiving an input to identify which documents in the plurality of documents are to be classified into the first node;
in response to said input, analyzing the plurality of documents by the natural language model, using the at least one rule, to determine which documents are to be classified into the first node; and
causing display of the documents that are determined to be classified into the first node.

10. The method of claim 9, further comprising causing display of documents that are determined to be classified into the first node, wherein the determination is made at least in part by the document triggering the at least one rule.

11. A system comprising:
a memory; and
a processor coupled to the memory and configured to:
access, at a first node in a logical hierarchy configured to guide classification of a plurality of documents by the natural language model, at least one rule associated with the first node, said at least one rule defining a first factor for determining whether a document among the plurality of documents is to be classified into the first node;
identify a percolation criterion associated with a second node in the logical hierarchy that is a parent node to the first node, said percolation criterion indicating that the at least one rule associated with the first node is to be associated also with the second node;
based on the identified percolation criterion, associate the at least one rule with the second node such that the at least one rule defines a second factor for determining whether the document is to also be classified into the second node;
access the document for natural language processing; and
classify the document according to the logical hierarchy by determining whether the document is to be classified into at least one of the second node and the first node based on the at least one rule associated with both the first node and the second node.

12. The system of claim 11, wherein the percolation criterion is a first percolation criterion, and the processor is further configured to:
identify a second percolation criterion associated with a third node in the logical hierarchy that is a parent node to the second node, said percolation criterion indicating that the at least one rule associated with the first node is to be associated also with the third node; and
based on the identified second percolation criterion, associate the at least one rule with the third node such that the at least one rule defines a third factor for determining whether the document is to also be classified into the third node.

13. The system of claim 11, wherein the processor is further configured to:
determine that a second percolation criterion is not associated with a third node in the logical hierarchy that is a parent node to the second node; and
based on said determination, limit the at least one rule to be associated only to the first node and the second node.

14. The system of claim 11, wherein classifying the document according to the logical hierarchy comprises analyzing the document utilizing the at least one rule to determine if the document is to be classified into the second node.

15. The system of claim 14, wherein classifying the document according to the logical hierarchy further comprises:
determining that the document is to be classified into the second node based at least in part on the at least one rule; and
based on said determination, analyzing the document utilizing the at least one rule to determine if the document is to be classified into one or more child nodes of the second node, the one or more child nodes including the first node.

16. The system of claim 11, wherein the processor is further configured to:
receive an input to identify which documents in the plurality of documents are to be classified into the first node;
in response to said input, analyze the plurality of documents by the natural language model, using the at least one rule, to determine which documents are to be classified into the first node; and
cause display in a display interface of the documents that are determined to be classified into the first node.

17. The system of claim 16, wherein the processor is further configured to cause display of documents that are determined to be classified into the first node, wherein the determination is made at least in part by the document triggering the at least one rule.

18. A non-transitory computer readable medium comprising instructions that, when executed by a processor, cause the processor to perform operations comprising:
accessing, at a first node in a logical hierarchy configured to guide classification of a plurality of documents by the natural language model, at least one rule associated with the first node, said at least one rule defining a first factor for determining whether a document among the plurality of documents is to be classified into the first node;
identifying a percolation criterion associated with a second node in the logical hierarchy that is a parent node to the first node, said percolation criterion indicating that the at least one rule associated with the first node is to be associated also with the second node;
based on the identified percolation criterion, associating the at least one rule with the second node such that the at least one rule defines a second factor for determining whether the document is to also be classified into the second node;

accessing the document for natural language processing; and classifying the document according to the logical hierarchy by determining whether the document is to be classified into at least one of the second node and the first node based on the at least one rule associated with both the first node and the second node.

19. The computer readable medium of claim 18, wherein the percolation criterion is a first percolation criterion, and the operations further comprise:

identifying a second percolation criterion associated with a third node in the logical hierarchy that is a parent node to the second node, said percolation criterion indicating that the at least one rule associated with the first node is to be associated also with the third node; and based on the identified second percolation criterion, associating the at least one rule with the third node such that the at least one rule defines a third factor for determining whether the document is to also be classified into the third node.

20. The computer readable medium of claim 18, wherein classifying the document according to the logical hierarchy comprises:

analyzing the document utilizing the at least one rule to determine if the document is to be classified into the second node;

determining that the document is to be classified into the second node based at least in part on the at least one rule; and based on said determination, analyzing the document utilizing the at least one rule to determine if the document is to be classified into one or more child nodes of the second node, the one or more child nodes including the first node.

* * * * *